United States Patent

[11] 3,567,850

| [72] | Inventor | Fritz Habel |
| | | Berlin, Germany |
| [21] | Appl. No. | 797,648 |
| [22] | Filed | Feb. 7, 1969 |
| [45] | Patented | Mar. 2, 1971 |
| [73] | Assignee | Telefunken Patentverwertungsgesellschaft m.b.H. |
| | | Ulm Danube, Germany |
| [32] | Priority | Feb. 8, 1968 |
| [33] | | Germany |
| [31] | | P 16 38 155.8 |

[54] ARRANGEMENT FOR PHASE-CORRECT REGULATION OF THE SPEED OF A ROTATING SHAFT
9 Claims, 6 Drawing Figs.

[52] U.S. Cl............................................... 178/6.6,
318/302, 310/93
[51] Int. Cl.................................................. H04m 5/76,
H02k 7/104
[50] Field of Search........................................... 310/93, 95;
318/302, 314, 329; 179/100.2, 100.15 (speed),
100.2 (T); 178/6.6 (A)

[56] References Cited
UNITED STATES PATENTS

| 2,782,355 | 2/1957 | Wilcox................... | 318/302 |
| 3,016,428 | 1/1962 | Kabell et al............. | 179/100.2 |
| 3,215,918 | 11/1965 | Lichowsky............... | 318/302 |

FOREIGN PATENTS

| 862,388 | 11/1940 | France................... | 317/6 |

*Primary Examiner*—D. X. Sliney
*Attorney*—Spencer and Kaye

ABSTRACT: An arrangement for improved regulation of the phase position of a rotating shaft includes an auxiliary circuit branch connected in parallel with the current path of a control signal, which auxiliary branch consists of a filter member and an auxiliary control amplifier, the arrangement being provided so that phase deviations of the control signal, which last for an extended period of time, as they might appear during changes of the synchronizing pulse frequency or of the mechanical friction conditions, become effective as an additional control value for the compensation of these changes.

ARRANGEMENT FOR PHASE-CORRECT REGULATION OF THE SPEED OF A ROTATING SHAFT

BACKGROUND OF THE INVENTION

1. Field of the Invention

The present invention relates to an arrangement for phase-correct regulation of the speed of a rotating shaft and more particularly to such arrangements in which a pulse generator rotating with the shaft produces one pulse for each revolution in a stationary scanning member and in which a control signal derived from phase comparison of these pulses with synchronizing pulses of a given frequency is fed to the adjustment member of the control circuit, particularly for regulating the speed of the head wheel shaft in video tape recorders. 2. Description of the Prior Art During magnetic recording and playback of television signals the requirements for accuracy of the speed regulations of the head wheel shaft are most exacting. Regulating arrangements are known in which a pulse generator is disposed on the shaft which produces a pulse during each revolution in a stationary scanning member. During the recording operation, these pulses are fed to a comparison circuit together with vertical synchronizing pulses obtained from a television receiver and simultaneously recorded on one of the edges of the tape. The direct current at the output of the comparison circuit which depends on a possible phase difference in the two pulse trains is fed, via a DC amplifier, to an eddy current brake associated with the head wheel shaft to act as an adjustment value. During playback the synchronizing pulses recorded on the tape are compared as to their phase positions with the pulses produced by the pulse generator attached to the head wheel shaft. These arrangements, however, operate satisfactorily only when no interference is present, such as from fluctuations in the supply voltage, variations of the frequency of the synchronizing signal or changes in the operating conditions of the mechanism of the tape recorder, which generally are of long duration compared with the time of one head revolution. The occurrence of these interfering influences which are dependent in part on temperature, however, can not be avoided in practice, neither during recording nor during playback. Each interference of this type initiates such a change in the brake current forming the control signal that the constancy of the revolutions of the head wheel is assured. Since, however, the brake current is a measure for the phase position of the head wheel shaft and directly corresponds to the phase angle, the changes in the brake current required to maintain constant the speed of the head wheel leads to an altered and thus incorrect phase position. Thus, over longer periods of time these interferences lead to permanent phase deviations of considerable magnitude. To correct this phase error the known video tape recorders are provided with a manually operable regulating device with which the phase position of the head wheel can be adjusted by the operator during playback. Since this adjustment is based only on observation of the television picture which is difficult to evaluate, it is critical and can be imposed only on skilled users of a video tape recorder which thus prevents the use of such recorders by most members of the public. A further drawback is that phase errors which become effective during recording, cannot be corrected since during recording the user has no available criterion for his adjustment.

The correct phase position is assured during recording in another known arrangement in which two synchronization circuits are provided, namely one which influences the rotational speed of the tape. The system provided for regulating the speed of the tap operates in essentially the same manner as that for the head wheel shaft and acts on a control circuit which furnishes the power for the tape transport motor. This arrangement is very complicated since it calls for two separate control circuits which must meet very high standards. During recording the rotational speed of the head is here also held at the same value as the frequency of the vertical synchronizing pulses. During playback the synchronizing pulses recorded on one of the edges of the tape are then compared with pulses derived from the power supply frequency and the rotational speed of the head wheel shaft is regulated in such a manner that the picture frequency is equal to the supply frequency. In spite of the complicated circuitry, this known arrangement can also not operate without an adjustment device for playback which must be manually operated by the user in order to adjust the phase relationship between the supply pulses fed into the two control circuits, this adjustment being based on a visual observation of the picture.

SUMMARY OF THE INVENTION

It is an object of the present invention to provide a regulating arrangement which is able to process even those phase deviations which at times lead to permanent phase errors, during recording as well as during playback operation. The present invention is based on an arrangement to regulate the number of revolutions as described in the introductory paragraph and provides a parallel circuit in the path of the control signal between the comparison circuit and the adjustment member, which parallel circuit consists of a first linear branch and a second branch in which a filter circuit and an auxiliary control amplifier are arranged in such a manner that phase deviations of the control signal below a given changing speed act as additional adjustment values in the adjustment member.

Since the control signal is divided into components which depend on the speed of the phase deviations, it is possible, without substantially increasing the circuitry and with only one control circuit for the rotational speed of the head wheel to provide a completely automatic elimination of even those phase errors which occur due to variations in the supply voltage or changes in the frequency of the synchronizing signal or in the friction conditions in the instrument. The arrangement according to the present invention is effective during recording as well as during playback and thus assures fault free reproduction of the picture signals recorded on the tape without requiring an additional manually operable adjustment device for the correction of the phase relationship. The stability of the fast reacting phase-regulating circuit is not influenced by the additionally connected auxiliary control amplifier if the filter is so dimensioned that only those phase deviations in the control signal which lie below a predeterminable speed change reach the auxiliary control amplifier.

BRIEF DESCRIPTION OF THE DRAWINGS

FIG. 3b is a graph plotting the changes in current occurring with time in one of the branches of the circuit of FIG. 1 in response to the frequency changes illustrated in FIG. 3a.

FIG. 3c is a graph plotting the changes in current occurring with time in the other of the branches of the circuit of FIG. 1 in response to the frequency changes illustrated in FIG. 3a.

DESCRIPTION OF THE PREFERRED EMBODIMENTS

Figure 1:
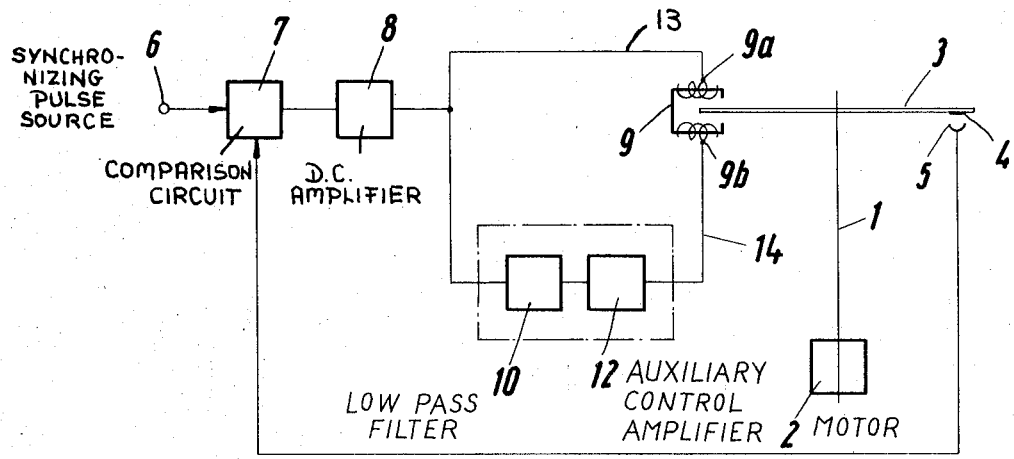
FIG. 1 is a block circuit diagram of one embodiment of a control circuit according to the present invention.

FIG. 1 shows the shaft 1 of a video tape recorder driven by a motor 2. The shaft is provided, in addition to the head wheel (not shown) with a disc 3 on which a pulse generator 4 is disposed which produces a pulse in a stationary scanning member 5 during each revolution of the disc. This pulse train and the normal vertical synchronizing pulses received from a video signal at an input 6 are compared in a comparison circuit 7 which may consist, for example, of a phase discriminator. The output of comparison circuit 7 is a direct current signal which is fed, after amplification in a DC amplifier 8 to a speed regulating means including an adjustment member 9 of the control circuit where it acts as control signal. In the illustrated embodiment, the adjustment member 9 is an eddy current brake having two control windings 9a and 9b. A parallel circuit for the control signal is provided at the output of the DC amplifier 8 between the comparison circuit 7 and the adjustment member 9. This parallel circuit includes a first linear branch 13 including winding 9a and a second linear branch 14 comprising the control winding 9b and a low pass filter 10 as well as an auxiliary control amplifier 12 providing relatively high amplification. The filter and the amplifier are disposed in front of the control winding 9b in such a manner that phase deviations in the control signal below a predeterminable change in speed become effective as additional adjustment values in the adjustment member.

Figure 1A:
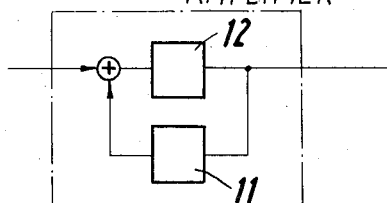
FIG. 1A is a fragmentary block circuit diagram showing a modification of a portion of the circuit of FIG. 1.

Instead of the series circuit consisting of a low pass filter 10 and the auxiliary control amplifier 12 as shown in FIG. 1, it is also possible to use the dual circuit shown in FIG. 1b with a high pass filter 11 disposed in a feedback branch leading from the output to the input of the auxiliary control amplifier 12. A high pass filter 11 could be used in the embodiment of FIG. 1 or a low pass filter 10 could be used in the embodiment of FIG. 1a.

Figure 2:
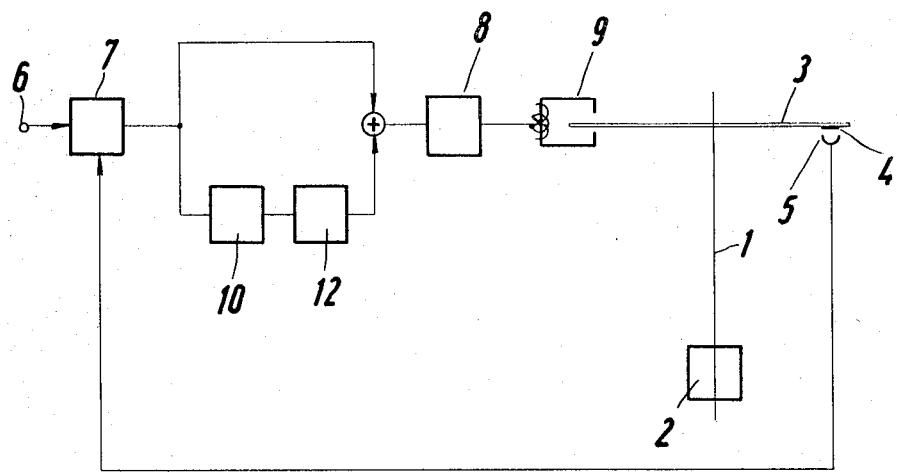
FIG. 2 is a block circuit diagram of another embodiment of the control circuit according to the present invention.

FIG. 2 shows another embodiment of the control circuit in which the same reference numerals as in FIG. 1 are used for circuit components of identical function.

The adjustment member here consists of a conventional eddy current brake 9 having only one winding. In this embodiment, the junction point for the control signal is directly connected with the phase discriminator 7. The parallel circuit consists, in this case, of a first linear branch and of a second branch again comprising a filter 11, and an auxiliary control amplifier 12 arranged in the same manner as in FIG. 1 or 1a. A DC amplifier 8 for amplifying the control signal is here disposed behind the parallel circuit in the path of the control signal between the summation point of the control signal and the winding of the eddy current brake.

The different embodiments of the control circuit shown in the block circuit diagrams are principally no different in their operation which will be described below for the case of a change in the synchronizing signal frequency during playback.

Figure 3A:
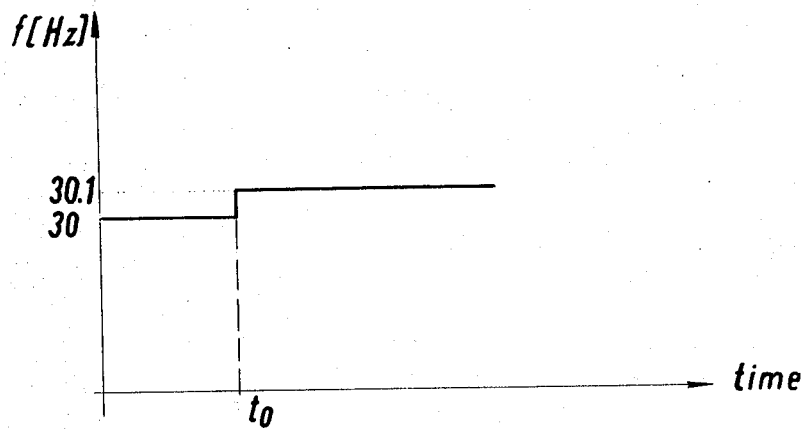
FIG. 3a is a graph plotting the changes in the signal frequency occurring with time in an exemplary situation whose effects are further illustrated in FIGS. 3b and 3c.
Figure 3B:
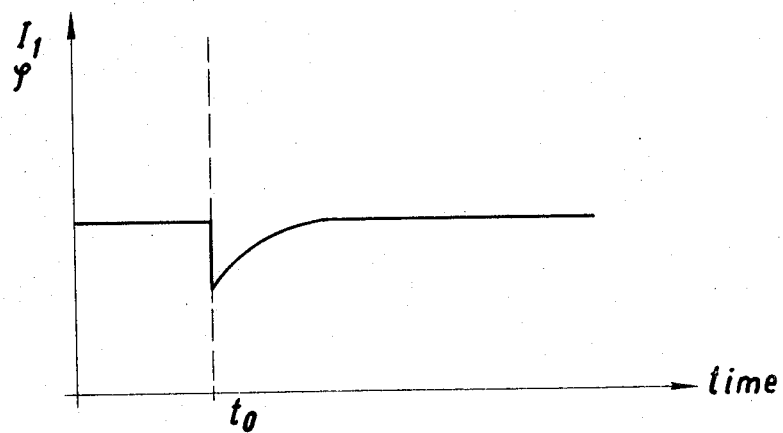
Figure 3C:
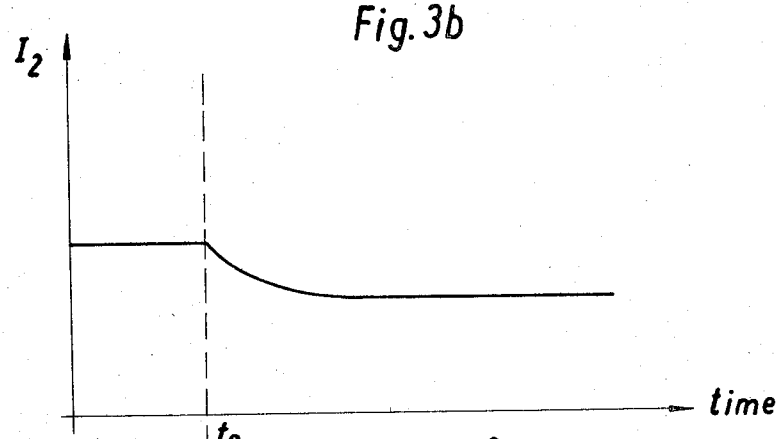

FIG. 3a shows the chronological course of the synchronizing signal frequency which corresponds, in a video tape recorder for home use, for example, to half the line frequency which is the usual picture changing frequency. Thus in the United States where a normal AC power frequency of 60 c.p.s. (or Hz.) is used the picture changing frequency and the synchronizing signal frequency is 30 Hz. At time $t_0$ this synchronizing signal frequency changes; for example, form 30 to 30.1 Hz. due to a change in the net voltage. In FIG. 3b the chronological behavior is plotted for the brake current component $I_1$ forming one component of the adjustment value and flowing in the first linear branch 13 of the parallel circuit for the control signal. This brake current component $I_1$ represents the behavior of the known control circuits and corresponds in the conventionally employed phase comparison methods directly to the phase angle $\Phi$ of the head wheel system and is thus a measure for the phase relationship of the head wheel with the synchronizing signal. The deviation of the control signal portion formed by the brake current component $I_1$ at time $t_0$ is thus brought back, after some time, to its originally given constant value by corresponding changes in the phase angle $\Phi$, a value for which the speed of the head wheel is constant even with a changed synchronizing signal frequency. The change in phase angle $\Phi$ effected to keep constant the head wheel speed indicates, however, a permanent phase deviation and thus an incorrect phase relationship of the head wheel with the synchronizing pulses which phase relationship is now corrected by an additional value. This additional control value is the component $I_2$ of the brake current flowing in the second branch 14 of the parallel circuit for the control signal whose chronological behavior is plotted in FIG. 3c. This effects a change in the total brake current $I_1 + I_2$ forming the adjustment value. The newly adjusted total brake current compensates the change in the synchronizing signal frequency and thus assures the correct phase relationship for the head wheel. This guarantees fault-free regulation of the rotational speed of the head wheel shaft.

With interference from other causes the control process is effected in the same manner and sense.

The above-described components 7, 8, 10, 11, and 12, are per se conventional. For example, the comparison circuit 7 may be of the type shown in "Fernsehtechnik," part 2, by F. Schroeter, Springer-Verlag, Berlin-Goettingen-Heidelberg 1963, page 51, FIG. II.10; the amplifiers 8 and 12, as shown in "The Application of Linear Microcircuits," Verlag SGS Fairchild, London-Milan-Paris-Stockholm-Stuttgart 1967, page 100, FIG. 3.30, and page 101, FIG. 3.31; the low-pass and high pass filters 10, 11, as shown in W. Oppelt, "Kleines Handbuch technischer Regelvorgange," Verlag Chemie GmbH, Weinheim/Bergstrabe 1964, page 71, Table 12.1, first column, and page 77, Table 13.1, first column.

If the mains frequency is 60 Hz. and the resonancy frequency of the control circuit is about 3 Hz., the cutoff of the low-pass filter (FIG. 1) is about 0.3 Hz. and of the high pass filter (FIG. 1a) is about 0.3 Hz. also.

It will be understood that the above description of the present invention is susceptible to various modifications, changes and adaptations.

I claim:

1. An arrangement for maintaining a rotating shaft in a desired phase position, said arrangement comprising, in combination: (a) a stationary scanning member; (b) means mounted for rotation with the shaft for producing at least one pulse for each revolution in the stationary scanning member; (c) means for supplying synchronizing pulses of a given frequency; (d) means for comparing the pulses generated in said scanning member with the synchronizing pulses and having an output producing a control signal proportional to the phase relationship between the pulses; (e) means for regulating the speed of the shaft; and (f) two branch circuits connected between said output of said comparison means and said regulating means, one of said branch circuits being a linear branch for continuously transmitting a linear representation of the control signal to said regulating means and the other of said branch circuits including filter means and auxiliary control amplifier means for applying to said regulating means an additional control value proportional to only those control signals which are below a predetermined frequency.

2. An arrangement as defined in claim 1 wherein said filter is a low-pass filter which is connected in series with the auxiliary control amplifier.

3. An arrangement as defined in claim 1 wherein said filter is a high pass filter connected in a feedback branch extending from the output to the input of the auxiliary control amplifier.

4. An arrangement as defined in claim 1 wherein said speed regulating means include an eddy current brake means for retarding the rotational speed of the shaft having two control windings and wherein the control windings are each disposed in a different branch of said parallel circuit.

5. An arrangement as defined in claim 4 including a DC amplifier means for the control signal arranged between the comparison circuit and the junction point of the two branches of the said parallel circuit.

6. An arrangement as defined in claim 1 wherein said speed regulating means is an eddy current brake means having a winding connected with the summation point of the parallel circuit.

7. An arrangement as defined in claim 6 including DC amplifier means for amplifying the control signal connected between the summation point of the parallel circuit and the winding of the eddy current brake.

8. An arrangement as defined in claim 1 wherein said shaft is a head wheel shaft in a video tape recorder.

9. An arrangement as defined in claim 8 wherein the synchronizing pulses are picture synchronizing pulses forming part of the video signal supplied to the recorder.